United States Patent
Danieau et al.

(10) Patent No.: US 10,536,682 B2
(45) Date of Patent: Jan. 14, 2020

(54) METHOD FOR REPRODUCING AN ITEM OF AUDIOVISUAL CONTENT HAVING HAPTIC ACTUATOR CONTROL PARAMETERS AND DEVICE IMPLEMENTING THE METHOD

(71) Applicant: THOMSON LICENSING, Issy de Moulineaux (FR)

(72) Inventors: Fabien Danieau, Rennes (FR); Julien Fleureau, Rennes (FR); Philippe Guillotel, Vern sur Seiche (FR); Nicolas Mollet, Meillac (FR); Antole Lecuyer, Rennes (FR); Marc Christie, Servon sur Vilaine (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 95 days.

(21) Appl. No.: 14/770,814

(22) PCT Filed: Feb. 24, 2014

(86) PCT No.: PCT/EP2014/053554
§ 371 (c)(1),
(2) Date: Aug. 26, 2015

(87) PCT Pub. No.: WO2014/131733
PCT Pub. Date: Sep. 4, 2014

(65) Prior Publication Data
US 2016/0014386 A1    Jan. 14, 2016

(30) Foreign Application Priority Data

Feb. 27, 2013   (EP) .................................... 13305220
Jul. 9, 2013    (EP) .................................... 13305980

(51) Int. Cl.
H04N 9/82       (2006.01)
H04N 5/232      (2006.01)
H04N 5/262      (2006.01)

(52) U.S. Cl.
CPC ....... H04N 9/8205 (2013.01); H04N 5/23296 (2013.01); H04N 5/262 (2013.01); H04N 5/2621 (2013.01)

(58) Field of Classification Search
CPC ..... A63G 31/16; A63J 25/00; H04N 5/23296; H04N 5/262; H04N 5/2621; H04N 9/8205

(Continued)

(56) References Cited

U.S. PATENT DOCUMENTS 3,469,837 A      9/1969  Heilig
2002/0105521 A1*  8/2002  Kurzweil ................ G06T 13/40
                                                    345/473

(Continued)

FOREIGN PATENT DOCUMENTS

JP    2011198373     10/2011
WO    WO2012116433    9/2012

OTHER PUBLICATIONS

G. de Haan and P. W. A. C. Biezen "An efficient true-motion estimator using candidate vectors from a parametric motion model" IEEE tr. on Circ. and Syst. for Video Techn. vol. 8 No. 1 Mar. 1998 pp. 85-91.*

(Continued)

Primary Examiner — Thai Q Tran
Assistant Examiner — Stephen R Smith
(74) Attorney, Agent, or Firm — Meagher Emanuel Laks Goldberg & Liao, LLP

(57) ABSTRACT

The present disclosure relates to a method for reproducing an item of video content filmed using a camera. An item of (Continued)

video content composed of sequences is developed and enhanced by commands applied to the camera at the time of filming. With a view to reproduction, the video content is divided into sequences. The commands applied to the camera are extracted for each sequence and make it possible to calculate at least one haptic actuator control parameter associated with this sequence. At the time of the reproduction of a sequence of the video content, at least one control parameter thus calculated controls at least one haptic actuator. In this way, the spectator perceives stimuli making it possible to enhance his perception of the video document during the reproduction. Advantageously, the player able to reproduce the enhanced content determines a cinematographic effect for a set of sequences from commands applied to the camera. Then the haptic metaphor associated with this effect is applied to this set of sequences.

21 Claims, 6 Drawing Sheets

(58) Field of Classification Search
USPC ............... 386/201, 224, 227, 239; 345/156; 348/36, 143
See application file for complete search history.

(56) References Cited

U.S. PATENT DOCUMENTS

| | | | | |
|---|---|---|---|---|
| 2002/0115043 | A1* | 8/2002 | Baker | G09B 19/16 434/30 |
| 2003/0068053 | A1 | 4/2003 | Chu | |
| 2004/0054512 | A1* | 3/2004 | Kim | G05B 17/02 703/8 |
| 2005/0168021 | A1* | 8/2005 | Real | A47C 15/004 297/217.3 |
| 2006/0028542 | A1* | 2/2006 | Rondinelli | H04N 5/23238 348/36 |
| 2007/0098268 | A1* | 5/2007 | Beresford | G06F 16/786 382/224 |
| 2008/0317386 | A1* | 12/2008 | Wood | G06F 3/016 382/307 |
| 2009/0158206 | A1* | 6/2009 | Myllyla | G11B 27/105 715/804 |
| 2011/0044604 | A1* | 2/2011 | Brokken | G06F 3/016 386/239 |
| 2011/0057941 | A1* | 3/2011 | Dengler | G06T 15/20 345/545 |
| 2011/0069229 | A1* | 3/2011 | Lord | H04N 5/77 348/461 |
| 2013/0117798 | A1* | 5/2013 | Ha | H04N 21/23614 725/126 |
| 2013/0227410 | A1* | 8/2013 | Sridhara | H04N 21/235 715/702 |
| 2014/0205260 | A1* | 7/2014 | Lacroix | H04N 5/765 386/201 |
| 2016/0014386 | A1* | 1/2016 | Danieau | A63J 25/00 386/227 |

OTHER PUBLICATIONS

Christie et al: "Camera Control in Computer Graphics"; Computer Graphics Forum, vol. 27, No. 8, pp. 2197-2218, Dec. 2008.
Danieau et al: "A Framework for Enhancing Video Viewing Experience with Haptic Effects of Motion" ;IEEE Haptics Symposium 2012, 2012, pp. 541-546.
Danieau et al: "Enhancing audiovisual experience with haptic feedback a survey on HAV-Transactions on Haptics", 2012; pp. 1-16.
Danieau et al: "HapSeat Producing Motion Sensation with Multiple Force-feedback Devices Embedded in a Seat";in VRST-12, 2012; pp. 1-8.
Smith et al: "Communicating emotion through a haptic link Design space and methodology"; International Journal of Human-Computer Studies, vol. 65, No. 4, pp. 376-387, 2007.
Thompson: "Grammar of the edit Second Edition"; Focal Press, 2009; pp. 1-225.
Thompson: "Grammar of the Shot-Second Edition", Focal Press, 2009; pp. 1-233.
www.d-box.com: Move the World; Jul. 8, 2015; pp. 1-2.
Silva et al: "Acoustic-Tactile Rendering of Visual Information"; Proc. of SPIE-IS&T Electronic Imaging, SPIE vol. 8291, 82910M-2012 SPIE-IS&T pp. 1-12.
Danieau et al: "Toward haptic cinematography enhancing movie experience with haptic effects based on Cinematographic Camera Motions"; Submitted on Dec. 12, 2013; pp. 1-19.
Chang et al: "Overview of the MPEG-7 Standard"; IEEE Transactions on Circuits and Systems for Video Technology, vol. 11, No. 6, Jun. 2001; pp. 688-695.
Park et al: "A Framework of sensory information for 4D home theater system—Natural Sciences Publishing Corp"; 2012; Appl. Math Inf. Sci 6, No. 1S, pp. 201S-207S.
Rehman et al: "Turn Your Mobile Into the Ball-Rendering live football game using vibration"; IEEE Transactions on Multimedia, vol. 10, No. 6, Oct. 2008; pp. 1022-1033.
Tsetserukou et al: "Affective Haptics in emotional communication", IEEE 2009; pp. 1-6.
Search Report dated May 14, 2014.

* cited by examiner

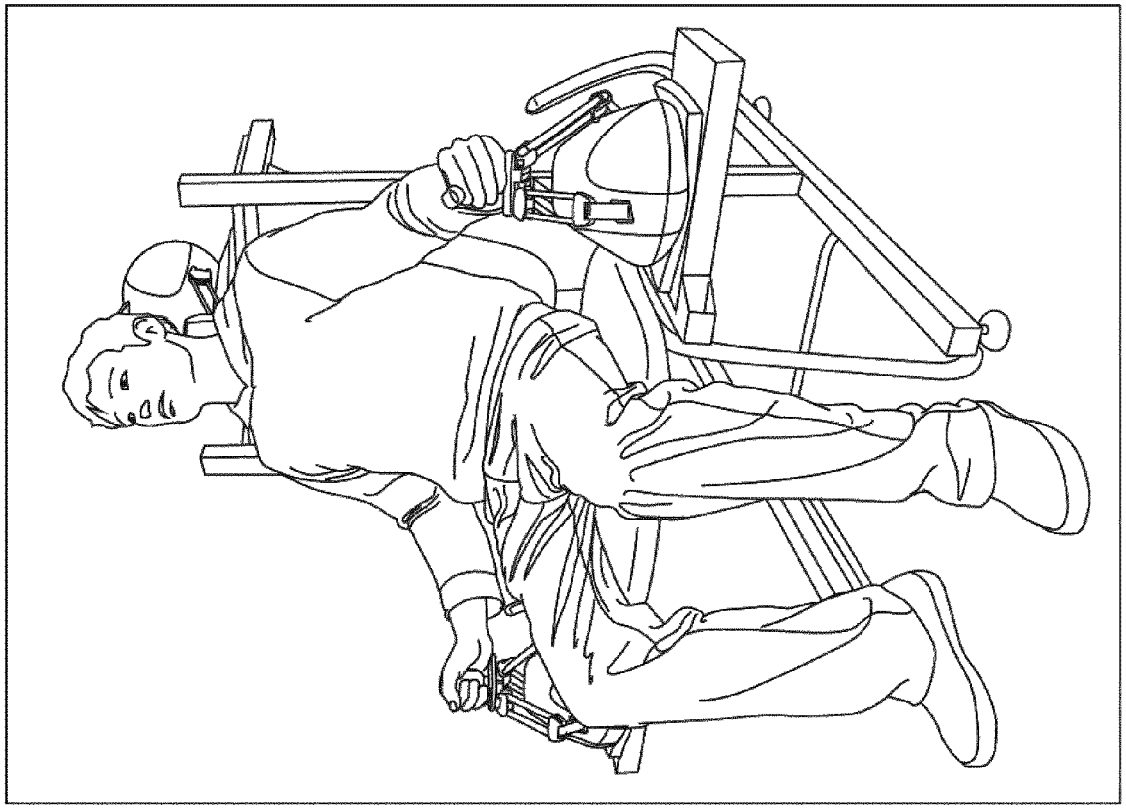
Fig. 3.a
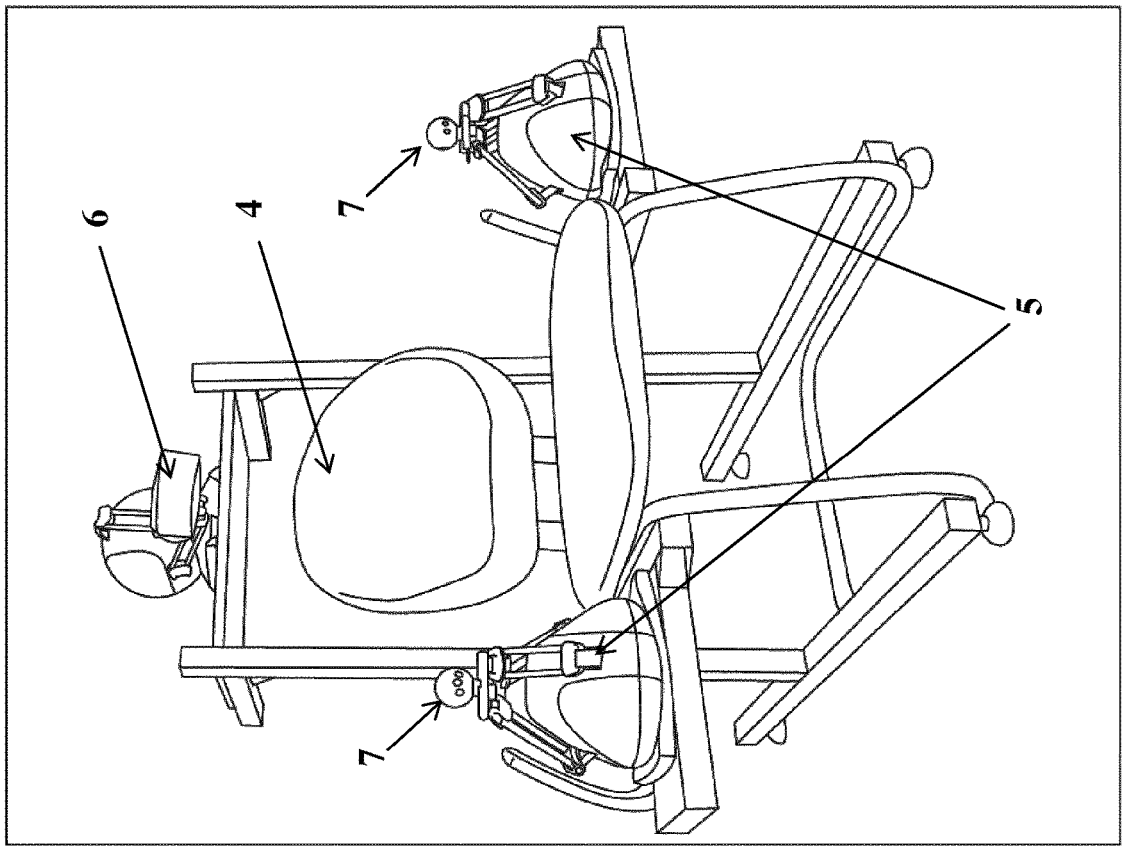
Fig. 3.b

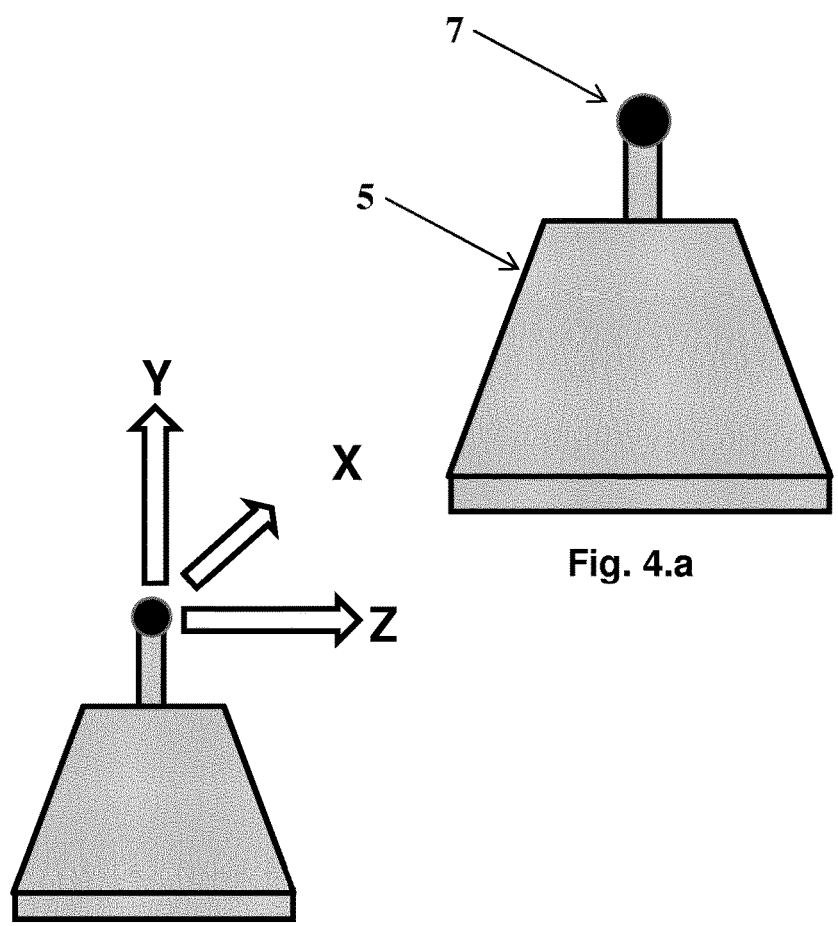
Fig. 4.a
Fig. 4.b
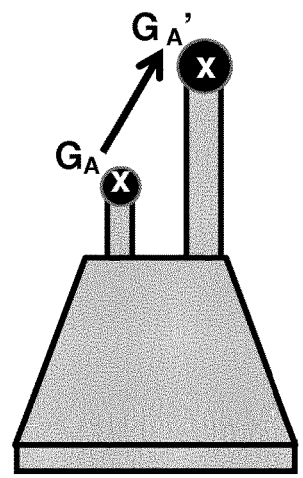
Fig. 4.c
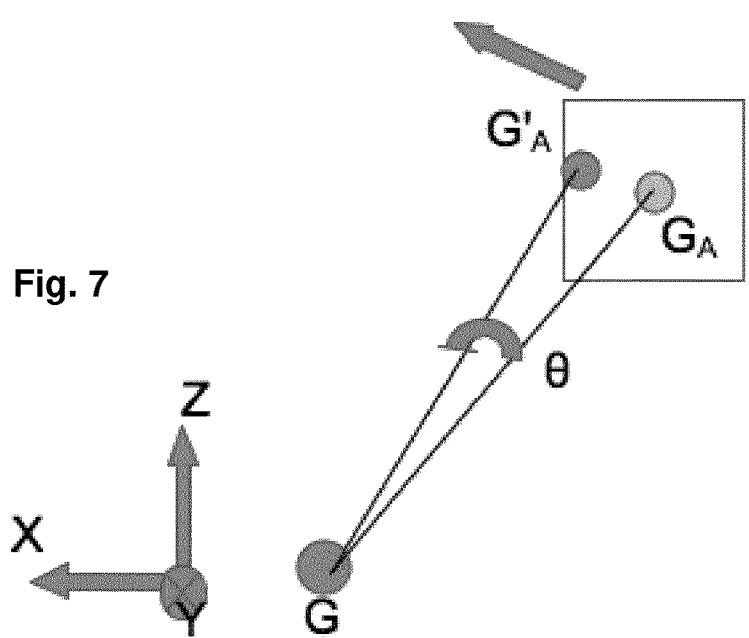
Fig. 7

METHOD FOR REPRODUCING AN ITEM OF AUDIOVISUAL CONTENT HAVING HAPTIC ACTUATOR CONTROL PARAMETERS AND DEVICE IMPLEMENTING THE METHOD

This application claims the benefit, under 35 U.S.C. § 365 of International Application PCT/EP2014/053554, filed Feb. 24, 2014, which was published in accordance with PCT Article 21(2) on Sep. 4, 2014 in English and which claims the benefit of European patent application No. 13305220.9 filed Feb. 27, 2013 and European patent application No. 13305980.8 filed Jul. 9, 2013.

1. TECHNICAL FIELD

The field of the present invention is that of the generation of haptic renderings during the reproduction of an item of audiovisual content. More specifically, the invention relates to the case where the audiovisual content comprises signals making it possible to control actuators generating movements on the body of the spectator.

2. BACKGROUND ART

These days, cinematographic techniques make it possible to enrich the audiovisual content and the experience of the spectator. The advent of 3D offers the spectator a real immersion in the film which is becoming increasingly realistic and impressive. Recently, items of equipment have been added to the seat on which the spectator is seated to give him sensations other than those provided by his sight alone. Thus, seats now move according to several degrees of freedom causing the spectator to experience a movement which is associated with the visual and possibly audio content. For example, in the case of a film shot on the front of a roller coaster car, when a descent is reproduced on the cinema screen, the spectator's seat tips slightly forward. Another example consists in making the cinema seats vibrate intensively from left to right during the reproduction of an earthquake scene.

Audiovisual content with haptic enhancement makes it possible to control actuators which cause the spectator to move during the reproduction of the document. In this way, the spectator is aware of the content not only by sight and hearing, but also by touch. His immersion in the reproduction of the document is thus greater and his impression of experiencing the event more intense.

Most of the time, haptic enhancements are added for films already made. An operator views the film and determines a sequence for which perception would be enhanced for the spectator by a movement performed on his person. The operator manually determines the type of movement (displacement, vibration, throbbing, trembling, etc.) and programs the activation of specific actuators during this sequence. The haptic parameters are added to the video and possibly audio signals on a specific medium. During the reproduction, the haptic parameters are read and transmitted to the actuators responsible for applying stimuli to the spectator. These stimuli can generate all kinds of sensations: well-being, anxiety, assurance, smallness, vertigo, etc.

Currently, these haptic parameters are calculated manually by an operator viewing the video or audiovisual content. There therefore exists a real need for a new technique making it possible to automate the creation of haptic actuator control parameters and the enhancement of new video content.

3. SUMMARY

The present disclosure proposes a new solution which does not have all the disadvantages of the prior art, in the form of a method for reproducing an item of video content filmed using a camera. This method comprises a step of processing the commands applied to the camera during the filming of one or more sequences in order to calculate at least one control parameter for at least one haptic actuator associated with the sequence or sequences and a step of controlling the at least one haptic actuator using the at least one control parameter calculated during the reproduction of the at least one sequence.

In this way, the video content is automatically enhanced by haptic actuator control parameters calculated from commands applied to the camera during filming of the sequence or various sequences of the video content.

According to a first embodiment, the numerical values of the commands applied to the camera produce numerical values controlling the haptic actuators. In this way, the action of the actuators is perfectly adapted to the video content which is reproduced at the same time.

According to another embodiment, a cinematographic effect is determined from commands applied to the camera, and the haptic actuator control parameter is calculated from the cinematographic effect thus determined. In this way, the action of the actuators on the spectator is well adapted to the cinematographic effect which the film-maker wanted to provide in the video content.

According to another embodiment, the video content and control values applied to the camera are transmitted during the sequences to a device for reproducing video content and controlling haptic actuators, the step of processing for calculating the haptic actuator control parameters being executed by this device. In this way, the control parameters for the actuators are well adapted to the installation used for the reproduction of the content.

According to another embodiment, the video content and haptic actuator control parameters are transmitted to a device for reproducing video content and controlling haptic actuators. In this way, the actuator control parameters are calculated only once by the film-maker.

According to another embodiment, a plurality of groups of haptic actuator control parameters are associated with each sequence of the content, each group of parameters being associated with a device for reproducing video content and controlling particular haptic actuators. In this way, the installation used for the reproduction of the content chooses the control parameters according to the haptic actuators available.

According to another embodiment, the duration of a sequence is a multiple of the duration for reproducing an image of the video content. In this way, the temporal division of the content during which a haptic control parameter is calculated is simpler.

According to another embodiment, the actuators are three in number, two actuators intended to be gripped, one in each hand, by a spectator, and one actuator intended to support the head of said spectator. In this way, the installation for reproducing video with haptic feedback is easy to install and relatively inexpensive.

According to another embodiment, if no cinematographic effect is detected during a sequence, then the haptic actuator control parameters associated with this sequence are calculated from control values applied to the camera during filming of this sequence. In this way, the spectator detects haptic sensations even in the absence of detectable cinematographic effects.

According to a first hardware aspect, the present disclosure also relates to a device for reproducing at least one sequence of an item of video content filmed using a camera, the device comprising at least one processor configured to process commands applied to the camera during filming of the at least one sequence in order to calculate at least one control parameter for at least one haptic actuator associated with the at least one sequence and to control the at least one haptic actuator using the at least one control parameter calculated during the reproduction of the at least one sequence.

According to a particular embodiment, the at least one processor is further configured to determine a cinematographic effect from commands applied to the camera, the control parameter for the at least one haptic actuator being calculated from the determined cinematographic effect.

Advantageously, the at least one processor is configured to control three haptic actuators, two actuators being intended to be gripped, one in each hand, by a spectator, and one actuator being intended to support the head of said spectator.

According to another aspect, the present disclosure also relates to a computer program comprising instructions for implementing the method for reproducing video content described above, when the program is executed by a processor.

4. LIST OF FIGURES

Other characteristics and advantages of the present disclosure will emerge more clearly upon reading the following description of a particular embodiment, provided as a simple non-restrictive example and referring to the annexed drawings, wherein:

FIG. 1 shows an example flowchart of the steps for implementing the method according to a particular embodiment of the invention, FIG. 2 shows a diagram of an example device for reproducing video content and controlling haptic actuators, FIGS. 3.a and 3.b show an example of a seat occupied and unoccupied by a spectator and equipped with haptic actuators, FIGS. 4.a, 4.b and 4.c show a diagram of actuators and the different degrees of freedom available, FIG. 5 shows a diagram of a spectator seated on a seat equipped with actuators according to a particular embodiment of the invention, FIG. 6 shows a diagram of a camera and examples of movements which can be applied thereto during filming.

FIG. 7 shows a movement of the haptic actuator during a sequence wherein the camera performs a rotation.

5. DESCRIPTION OF AN EMBODIMENT OF THE INVENTION

5.1 General Principle

The general principle of the present disclosure lies in a method for reproducing an item of video content filmed using a camera. An item of video content composed of one or more sequences is developed and enhanced by commands applied to the camera at the time of filming. The commands applied to the camera are extracted for each sequence and make it possible to calculate at least one control parameter for one or more haptic actuators associated with this sequence. When the commands applied to the camera cannot be extracted from the video sequence or sequences, these commands are estimated from the video sequence or sequences, as described for example in the article by Thomas G A entitled "Sports Real-Time Camera Pose Estimation for Augmenting Scenes" published in February 2006 during the Conference on Visual Media Production (CVMP) in London. At the time of the reproduction of a sequence of the video content, at least one control parameter thus calculated controls at least one haptic actuator. In this way, the spectator perceives stimuli making it possible to enhance his perception of the video document during the reproduction.

Advantageously, the player able to reproduce the enhanced content determines a cinematographic effect for a set of sequences from commands applied to the camera. Then the haptic metaphor associated with this effect is applied to this set of sequences.

5.2 General Description of an Embodiment

Figure 1:
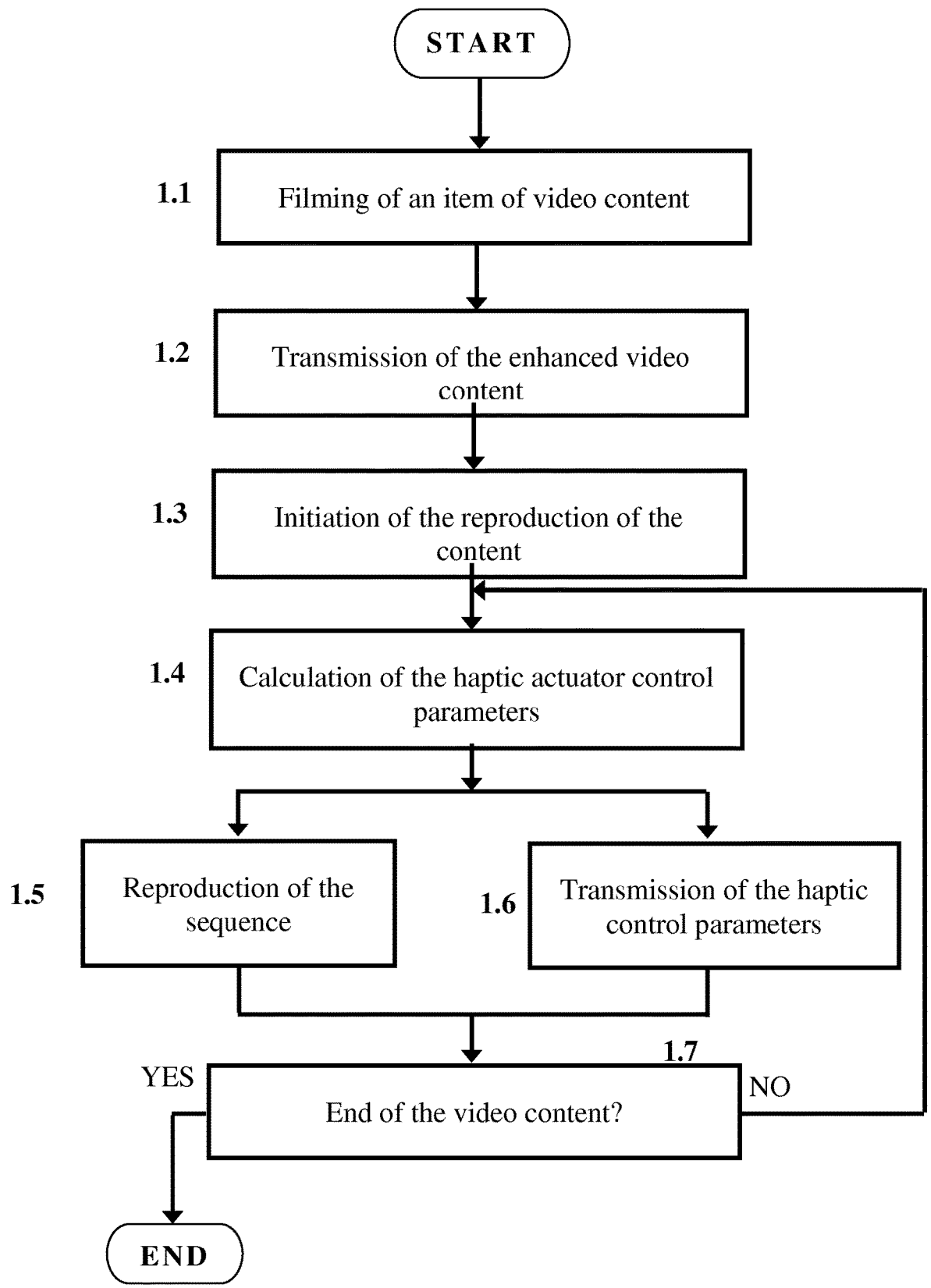

FIG. 1 shows an example flowchart of the steps for implementing the method according to one embodiment.

Initially, in step 1.1, an item of video or audiovisual content is filmed. The commands applied to the camera throughout filming are recorded and each group of commands applied to a sequence of given images is associated with this sequence. The content constituted of video data, camera commands and possibly audio data is transmitted to a location where it is reproduced (step 1.2). In step 1.3, a user initiates the reproduction of the content. During the reproduction and for each sequence, the commands applied to the camera are processed in order to calculate at least one haptic actuator control parameter associated with this sequence (step 1.4). Concomitantly, a sequence of the video content is reproduced (1.5) and at least one control parameter thus calculated controls at least one haptic actuator during the reproduction of this associated sequence (1.6).

In step 1.7, the end of the document is tested. If there remain other sequences to be reproduced, the program loops to step 1.4.

Figure 2:
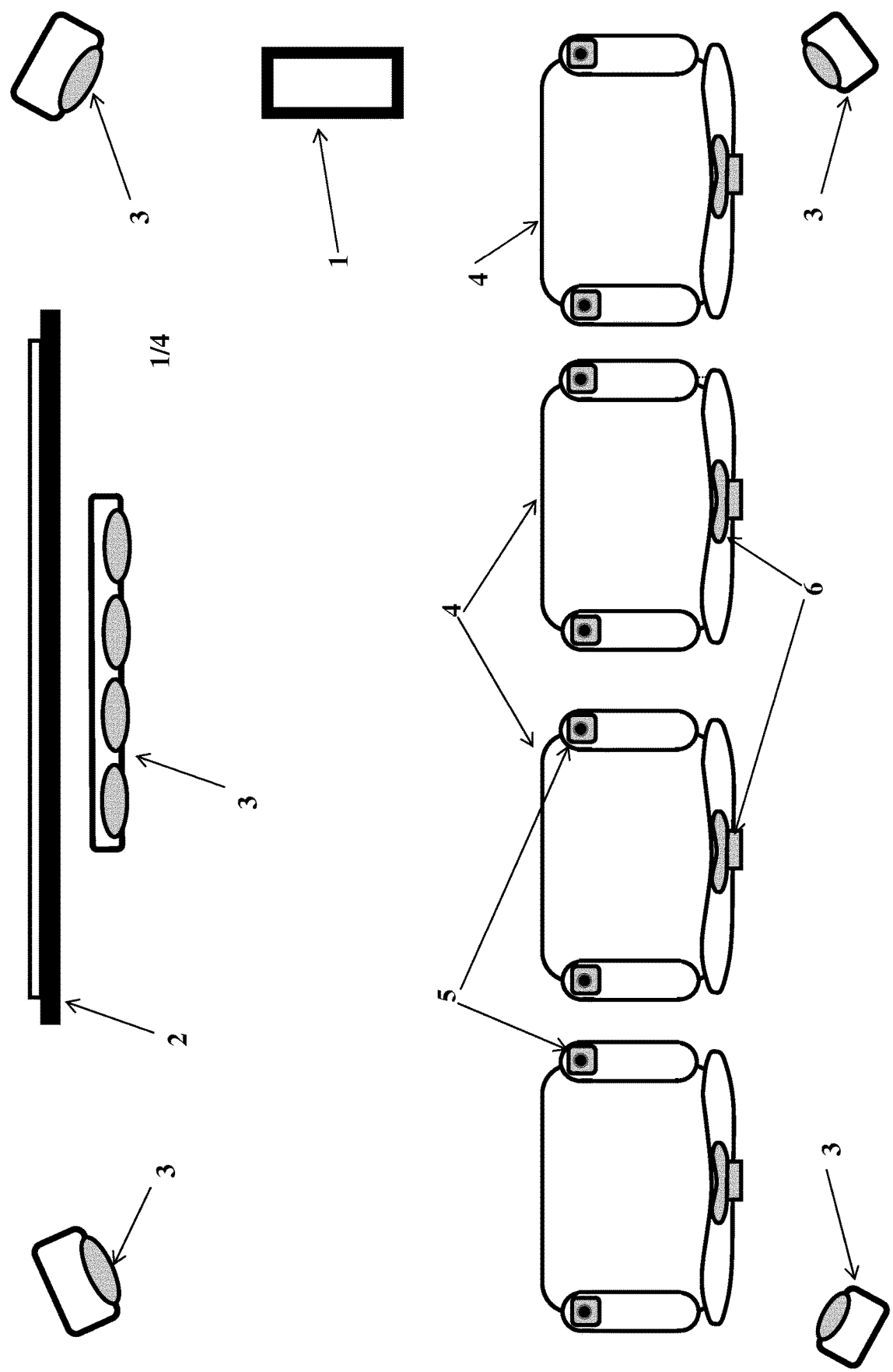

FIG. 2 shows a diagram of a device for reproducing video content and controlling haptic actuators. This device is generally installed in a room dedicated to the reproduction of such content, such as a cinema for example, but the present disclosure also covers the case of a home installation receiving audiovisual content enhanced by parameters intended to control haptic actuators. According to a preferred embodiment, such a device comprises:

- an enhanced audiovisual content player 1; this player can play DVD or Blu-ray discs, or contains a hard disc onto which such content is downloaded,
- a reproduction screen 2 which can be a flat-screen, or a video projector projecting images onto a screen,
- at least one sound reproduction means 3, typically loudspeakers distributed about the room,
- at least one haptic seat 4 arranged facing the screen 2, this seat comprising two hand actuators 5 and a head actuator 6.

The player 1 processes the data of the video content, and calculates the signals to be sent to the reproduction screen 2, the speakers 3 and the set of haptic seats 4. The transmission of the data can be done by cables connecting these various elements or by radio waves. The haptic rendering according to the present disclosure consists in converting the commands which have been applied to the camera during filming of the content into control parameters for controlling the haptic actuators. The actuators cause a movement to a part of the body of a spectator or generate a tactile sensation. The perception of the content which is provided by what the spectator sees and hears is enhanced by what the spectator feels through his body.

Figure 8:
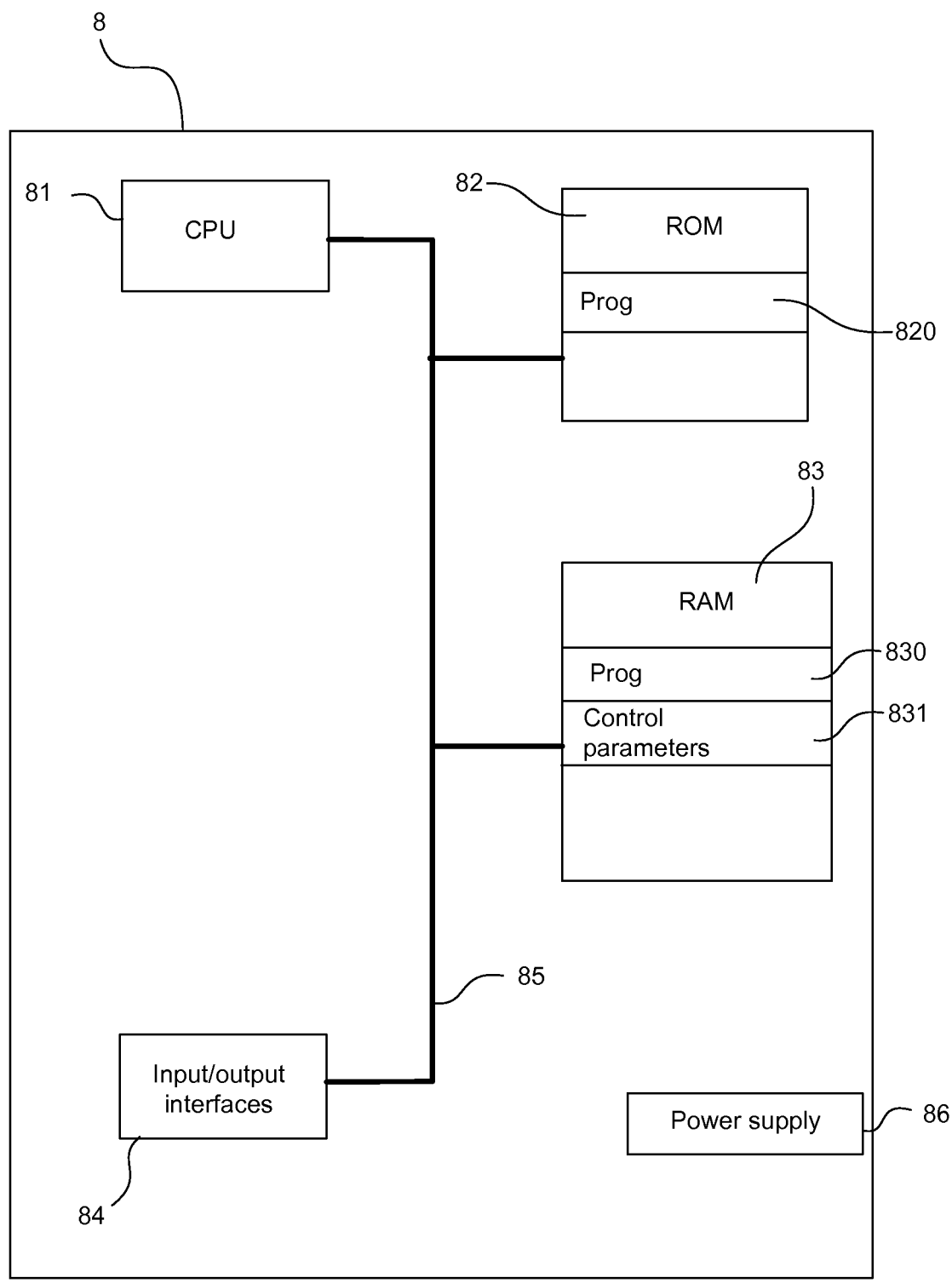
FIG. 8 shows a device configured to control haptic actuators according to a particular embodiment of the invention.

FIG. 8 diagrammatically shows a hardware embodiment of a device 8 configured for the reproduction of one or more video sequences and for the control of the haptic device or devices of FIG. 2. The device 8 corresponding for example to a personal computer, a laptop, a set-top box or an image processing module which may or may not be embedded in a display device.

The device 8 comprises the following elements, connected to each other by an address and data bus 85 which also transports a clock signal:
- a microprocessor 81 (or CPU);
- a non-volatile memory of ROM (Read Only Memory) type 82 comprising for example a program 820 of operating system type;
- a random access memory (RAM) 83;
- one or more I/O (Input/Output) devices 84 such as for example a keyboard, a mouse, a webcam; and
- a power supply 86.

It is noted that the word "register" used in the description of memory 83 designates in each of the memories mentioned a memory zone of low capacity (some binary data) as well as a memory zone of large capacity (enabling storage of a whole program or all or part of the data representative of data calculated or to be displayed).

When switched on, the microprocessor 81 loads and executes the instructions of the program contained in the RAM 83.

The random access memory 83 notably comprises:
- in a register 330, the operating program of the microprocessor 81 responsible for switching on the device 8;
- control parameters 831 for the haptic actuator or actuators calculated during the reproduction of the video sequence or sequences.

The algorithms implementing the steps of the method specific to the present disclosure and described below are stored in the RAM 83. According to a variant, the device 8 comprises a graphics card comprising one or more GPUs (graphical processing units) associated with a GRAM (graphical random access memory), the control parameters for the actuator or actuators in this case being stored in the GRAM. According to another variant, the power supply 86 is external to the device 8.

FIGS. 3.a and 3.b show a haptic seat 4 according to a preferred embodiment. This seat comprises a seat portion and a backrest. A hand actuator 5 is placed on each side of the seat portion in a position in which the spectator can easily grip them. A third actuator, called the "head" actuator 6, is placed in the position of a headrest. The head actuator 6 comprises a cushion in the shape of a crescent in the hollow of which the spectator places his head. The position of each of the actuators with respect to the seat 4 is adjustable in order to be adapted to the height and the morphology of each spectator. FIG. 3.b shows a seated spectator, having in each hand the knob of an actuator 5 and placing his head on the cushion of the third actuator 6. FIGS. 3.a and 3.b are only mentioned as examples; the actuators can cause armrests, or plates whereon the spectator places his feet, or any other element in contact with a part of the body of the spectator, to move.

Each haptic actuator 5 and 6 has three degrees of freedom. FIGS. 4.a, 4.b and 4.c show a diagram of hand actuators and the different degrees of freedom available. The actuator shown by FIG. 4.a comprises a body 7 tapering towards the top and a vertical shaft 8 protruding from the top of the body. The vertical shaft 8 has a knob 9 at the top intended to be gripped by the spectator. The actuator comprises means for moving the vertical shaft 8 in three mutually orthogonal directions denoted in the standard way by X, Y and Z. From the spectator's position, the shaft 8 can be moved back and forth by performing a translation in the direction of the Z axis, left and right by performing a translation in the direction of the X axis and upwards or downwards in the direction of the Y axis. FIG. 4.b shows the three possible displacements of the vertical shaft 8 in directions X, Y and Z. FIG. 4.c shows an example displacement where the shaft 8 and its knob 9 move in the three directions. That is to say, $G_A$ is the initial position of the knob and $G_A'$ is the final position of the knob; the displacement of the knob is represented by the vector $G_A G_A'$.

Figure 5:
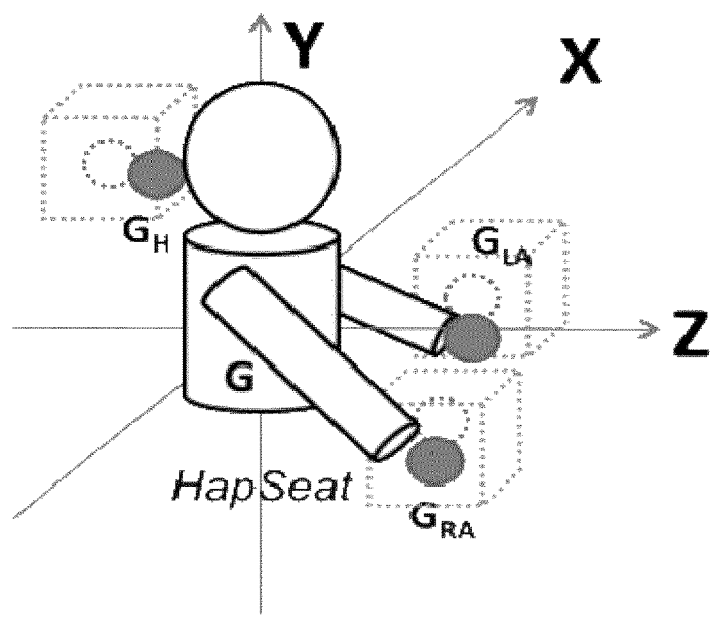

FIG. 5 shows a diagram of a spectator placing his head against the head actuator 6 and holding two hand actuators 5. In the prototype, the head actuators and hand actuators are of the same type for increased ease of implementation, but it is possible to use specific actuators which are adapted to the part of the body subject to a movement.

A way of calculating at least one haptic actuator control parameter, from commands applied to the camera, will now be detailed using two variants.

5.3 Calculation of Parameters Using Transmitted Control Values

Figure 6:
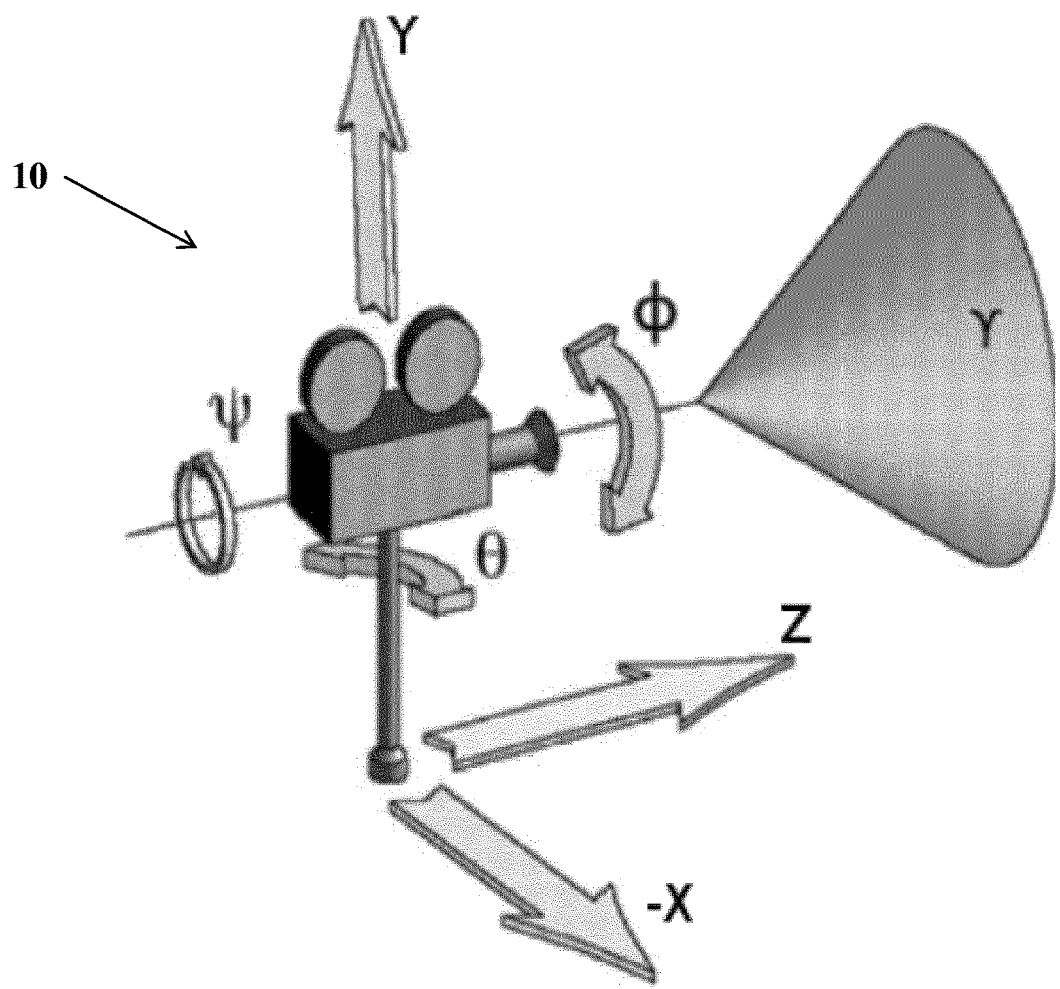

FIG. 6 shows a diagram of a camera 10 and the options of commands which are applicable thereto during filming and making of a video document. The term "camera" designates any device for capturing animated images, this capture device being able to be integrated in a device intended for another use, such as a mobile telephone for example. The camera 10 is placed in an orthogonal coordinate system defining three directions X, Y and Z. According to the example shown, the camera can be controlled by the following seven commands:
- displacement x along the X axis (to the left or to the right)
- displacement y along the Y axis (forwards or backwards)
- displacement z along the Z axis (upwards or downwards)
- angle of rotation θ about the Y axis (orientation of the camera)
- angle of rotation φ about the X axis (orientation of the camera)
- angle of rotation φ about the Z axis (orientation of the camera)
- zoom γ command for the camera.

The commands applied to the camera 10 are continually recorded during filming and associated with a sequence of a determined duration. These commands can be measurements from displacement sensors (such as gyroscopes) measuring the displacements and the rotations which an operator applies manually to the camera. This determined duration corresponds for example to the time for reproducing an image. For an item of video content reproduced with 24 images per second, the sampling time is 41.66 milliseconds. Each image taken at an instant t is associated with a group C(t) of control values applied to the camera:

$$C(t)=[x_c(t),y_c(t),z_z(t),\phi_c(t),\theta_c(t),\psi_c(t),\gamma_c(t)]$$

It is possible to use other durations for sequences associated with a group of commands for the camera. These durations are preferably multiples of the time for reproducing an image of the video content. For example, if the duration corresponds to the time for reproducing 10 images (that is to say 416.6 milliseconds), the associated group comprises the total displacement and the total angle of rotation applied to the camera during the filming of these ten images. Each group C(t) of control values is associated with the set of images of a sequence of the content. The video content as it is transmitted for the purposes of reproduction notably comprises the audiovisual data associated with a succession of groups of control values for the camera.

The video document thus enhanced is transmitted by any means to the reproduction location, an example of which is shown in FIG. 2. The transmission is done using a medium (DVD, Blu-ray, cinematographic film, etc.) or using a download via a communication network.

At the time of the reproduction, the player 1 divides the audiovisual content into sequences associated with a group C(t) of control values applied to the camera; a sequence can contain a single image. Then, the player 1 calculates at least one haptic actuator control parameter associated with this sequence. According to a preferred embodiment, the player controls three actuators each having three degrees of freedom. At any time, an actuator can be represented by a vector representing the position in space of the knob with respect to the base of the actuator. That is to say, given the point $G_A$ of the centre of the knob 9 at a given instant t, and the point $G_A'$ at the next instant t+1, the command for controlling an actuator A at a given instant consists in calculating the coordinates of the vector $\overrightarrow{G_A G_A'}$ using the following equation:

$$\overrightarrow{G_A G_A'} = f(\vec{T}, \vec{R}, \vec{F})$$

$$\text{where: } f(\vec{T}, \vec{R}, \vec{F}) = \frac{\vec{T}\|\vec{T}\| + \vec{R}\|\vec{R}\| + \vec{F}\|\vec{F}\|}{\|\vec{T}\| + \|\vec{R}\| + \|\vec{F}\|}$$

The vectors $\vec{T}, \vec{R}, \vec{F}$ represent respectively a translation, a rotation and a zoom of the image. The vectors $\vec{T}, \vec{R}, \vec{F}$ are defined by the following equations:

$$\vec{T} = \begin{bmatrix} k_x & 0 & 0 \\ 0 & k_y & 0 \\ 0 & 0 & k_z \end{bmatrix} \begin{bmatrix} x_c \\ y_c \\ z_c \end{bmatrix}$$

$$\vec{R} = (R_x(m_x\varphi_c)R_y(m_y\theta_c)R_z(m_z\psi_c) - I_3)\overrightarrow{GG_A'}$$

$$\vec{F} = \begin{bmatrix} 0 & 0 & 0 \\ 0 & 0 & 0 \\ 0 & 0 & s_z \end{bmatrix} \begin{bmatrix} 0 \\ 0 \\ \gamma_c \end{bmatrix}$$

As can be seen in the above equation, the vector $\vec{T}$ depends on three values $x_c$, $y_c$ and $z_c$ applied to the camera during filming of the video content at an instant t. The vector $\vec{R}$, depends on three possible rotations $\theta_c$, $\phi_c$ and $\varphi_c$ of the camera at a given instant t and the zoom $\gamma_c$ corresponds to a translation F in the forward direction (zoom in) or in the backward direction (zoom out) at a given instant t. Rx, Ry and Rz are 3D matrices about the x, y and z axes of the camera, and $I_3$ is the identity matrix in $R^3$.

The equations above are given only by way of example; they define the movement of the actuator according to the movement made by the camera during filming. The equation describing the function R is particular in the sense that it transforms a rotation of the camera into a translation applied to the vertical shaft of the actuator. This transformation is linked to the position of the actuator in space. The movement is different for each actuator.

FIG. 7 shows a movement of the haptic actuator during a sequence wherein the camera performs a rotation. In this figure, the diagram is a top view of FIG. 6 (only one actuator, the right-hand one, is shown). That is to say, G is a point situated on the user, for example the middle of his torso. The position $G_A'$ is determined by a rotation of the point $G_A$ about the point G. It is then possible to calculate the vector $\overrightarrow{G_A G_A'}$.

For example, if the camera performs a rotational movement $\theta$ about the Y axis, the equation for C becomes: C(t)=[0, 0, 0, 0, $\theta$(t), 0, 0].

The vector calculations are:

$$\overrightarrow{GG_A'} = R_y(\theta_c)\overrightarrow{GG_A} \quad \overrightarrow{G_A G_A'} = \overrightarrow{GG_A'} - \overrightarrow{GG_A} = (R_y(\theta_c) - I_3)\overrightarrow{GG_A}$$

The principle is generalised for all the rotations in the preceding equations for the vector $\vec{R}$, The values k, m and s are reduction factors ensuring that the position calculated for each vertical shaft 8 does not leave its work space within the actuator.

For example, assume that the camera makes a movement of 2 metres in the forward direction, which corresponds numerically to z=2 m; the equation C then takes the following values.

$$C(t)=[0,0,2,0,0,0,0]$$

In the prototype, the work space of a vertical shaft is represented by a 10 cm (0.1 m) cube. The actuator can be moved from −0.05 to +0.05 m along an axis. Thus the camera movement results in a forwards displacement of the actuator of 0.05 m. In this example Kz=0.025 and the equation of the vector $\overrightarrow{G_A G_A'}$ becomes:

$$\overrightarrow{G_A G_A'} = \begin{bmatrix} 0 & 0 & 0 \\ 0 & 0 & 0 \\ 0 & 0 & 0.025 \end{bmatrix} \begin{bmatrix} 0 \\ 0 \\ 2 \end{bmatrix} = \begin{bmatrix} 0 \\ 0 \\ 0.05 \end{bmatrix}$$

It is noted that the vectors $\vec{R}$, and $\vec{F}$, are zero in this example; the haptic movement only corresponds to a translation.

If the same control value is applied to the camera during a determined period, this period constitutes a complete sequence during which the maximum amplitude of the movement of the camera is used to calculate factor k.

The other factors m and s are calculated in the same way. The vectors T, R and F make it possible to control the three degrees of freedom of each actuator. For example, when the camera performs a rotation to the right, then the right-hand actuator moves forward, the left-hand actuator moves back and the head actuator pivots slightly to the right.

The player 1, while sending the video signals to the screen 2 and the audio signals to the loudspeakers 3, calculates the actuator control parameters and transmits them in real time. The set of signals (video, audio and haptic control parameters) are transmitted synchronously so that the movements generated by the actuators correspond to the images and sounds of the associated sequence.

5.4 Calculation of Parameters by Determining Cinematographic Effects

A variant embodiment of the present disclosure consists in analysing the commands applied to the camera during a sequence or a group of sequences in order to determine a cinematographic effect during this sequence and in applying control parameters corresponding to this effect to the various haptic actuators.

Here is an example of a list of cinematographic effects which can be detected by analysing the commands applied to the camera during filming:

"arc shot".

This effect consists in rotating around characters to emphasise these characters in a scene. The haptic metaphor consists in moving the knobs of the two hand actuators towards each other in order to give the impression that the spectator is concentrating.

"crane shot".

This effect consists in moving the camera back (for a crane shot which tracks out) while raising it above the scene; this effect is often used at the end of a film to give a feeling of moving backwards and soaring above the object filmed. The haptic metaphor consists in applying small tilting movements to the actuators to simulate a wing movement enabling the spectator to soar.

"Dutch angle (image tilted slightly to the left)".

This effect consists in filming a scene while tilting the camera slightly to the left to view a character in an unusual way and make him appear disturbing. The haptic metaphor consists in rocking the knobs of the hand actuators from left to right alternately in order to destabilise the spectator and give him an unsettled feeling.

"travelling shot".

This effect consists in performing a lateral displacement, in order to show scenery or to follow a moving character. The haptic metaphor consists in simulating a crabwise advance, that is to say quickly moving the right hand away, then quickly moving the left hand away while slowly bringing the right hand back to its original position, then quickly moving the right hand away while slowly moving the left hand back, and so forth.

"tilt shot".

This effect consists in filming a character either from above or below. A tilt-down shot causes a dwarfing effect. It can be used, among other things, for expressing the point of view of a character or for restoring the subject to being a detail in the shot. A tilt-up shot can be used to increase the significance of the subject in the shot and give the spectator an impression of smallness. According to the subject, the tilt-up shot can be associated with a "natural" point of view: if the Eiffel Tower is filmed using tilt-up shots, a human-scale point of view is adopted. The haptic metaphor consists in bringing the three actuators downwards, the hands and the head tilting forwards.

"vertigo shot".

This effect is so called as it was used in the film "Vertigo" by Alfred Hitchcock. This effect consists in giving the spectator the impression of vertigo. The camera moves forward while zooming out and the object filmed at the centre of the image hardly changes appearance in contrast to what surrounds it. The haptic metaphor consists in moving the knobs apart giving the spectator the strange impression that the scene is opening up.

"zoom".

This effect is the standard zoom-in shot. The haptic metaphor consists in imitating walking by moving the knobs of the two hand actuators forward one after the other.

For each sequence of the video content, the player detects at most one cinematographic effect. If a same effect is present in several consecutive sequences, then these sequences are grouped together in one set and the player transmits, during the reproduction of this set of sequences, the actuator control parameters corresponding to the haptic metaphor associated with this cinematographic effect.

According to an improvement, if no cinematographic effect is detected during a sequence, then the program applies the equations described in the first variants and calculates the haptic actuator control parameters associated with this sequence by directly using the commands applied to the camera during the filming of this sequence.

According to an improvement, the player 1 detects the amplitude of the cinematographic effect for the spectator, and weights the value of the parameters generating the haptic metaphor by amplitude and, if the movement is cyclic, the frequency of the movement applied to the spectator.

The amplitude of a cinematographic effect can be deduced from the control values applied to adjust the camera during filming. Take for example a tilt-up effect (rotation $\phi$ about the X axis) which corresponds to:

$$C(t)=[0,0,0,\phi(t),0,0,0]$$

The tilt-up angle determines the amplitude of the cinematographic effect and this amplitude becomes a coefficient for the haptic rendering command. An effect C1 will be greater than an effect C2 if $\phi_1(t)>\phi_2(t)$.

This information can then be used to modulate the power of the cinematographic effect.

According to another example, the following command is associated in order to determine the haptic rendering of the tilt-up, that is to say the vector:

$$\overrightarrow{G_A G'_A} = \begin{bmatrix} 0 & 0 & 0 \\ 0 & k_y & 0 \\ 0 & 0 & 0 \end{bmatrix} \begin{bmatrix} 0 \\ \phi \\ 0 \end{bmatrix}$$

(the angle of rotation moves the actuator A along the Y axis),

In this case, the haptic effect for C1 will be automatically greater than for C2.

According to an improvement applied to the two variants previously described, the content provider calculates the actuator control parameters beforehand and associates them with the sequences of the video content. In this way, the calculation is only performed once and the players 1 responsible for reproducing the content do not need to carry out this processing. This improvement can be used if the content provider knows the characteristics of the actuators used during the reproduction and their positions with respect to the spectators. If the rooms dedicated to the reproduction of an item of enhanced content have different actuator models, then the video document can contain different sets of actuator control parameters, the player retrieving that which is intended therefor during the reproduction.

While the present disclosure was described in reference to particular illustrated embodiments, the present disclosure is in no way limited to these embodiments, but only by the appended claims. It should be noted that changes or modifications to the embodiments previously described can be contributed by those in the profession, without leaving the framework of the present disclosure.

The embodiments previously described are for example implemented in a method or a process, an apparatus, a software program, a data stream or a signal. A device or apparatus implementing the interpolation method described is for example in the form of hardware components, programmable or not, in the form of one or more processors (advantageously of GPU type but also of CPU or ARM type according to variants). The methods described are implemented for example in an apparatus comprising at least one processor, which refers to processing devices in general, comprising for example a computer, a microprocessor, an integrated circuit or a programmable software device. Processors also comprise communication devices, such as for example computers, mobile or cellular telephones, smartphones, portable/personal digital assistants (PDAs), digital tablets or any other device enabling the communication of information between users.

The embodiments of the various processes and various characteristics described previously can be implemented in various equipment or applications, for example notably in an item of equipment or applications associated with the coding of data, the decoding of data, the generation of views or images, texture processing, and any other processing of images or information representative of texture and/or information representative of depth. Examples of such an item of equipment are an encoder, a decoder, a post-processor processing the outputs of a decoder, a preprocessor supplying inputs to an encoder, a video coder, a video decoder, a video codec, a web server, a set-top box, a laptop, a personal computer, a mobile telephone, a PDA, a digital tablet and any other communication device. The item of equipment can be mobile or on board a mobile vehicle.

Moreover, the methods described can be implemented in the form of instructions executed by one or more processors, and such instructions can be stored on a medium that can be read by a processor or computer, such as for example an integrated circuit, any storage device such as a hard disc, an optical disc (CD or DVD), a random access memory (RAM) or a non-volatile memory (ROM). The instructions form for example an application program stored in a processor-readable medium. The instructions take for example the form of hardware, firmware or software.

The invention claimed is:

1. A method of reproducing at least one sequence of a video content filmed using a camera, the video content being a first part of an enhanced content, the method comprising
retrieving a cinematographic effect from a predetermined set of cinematographic effects analyzing commands applied to the camera when filming the at least one sequence; said at least one data being a second part of the enhanced content and comprising at least zoom commands for said camera; a cinematographic effect of said predetermined set being associated with a sequence of camera commands to retrieve when analyzing; and
controlling, during the reproduction of the at least one sequence, at least one haptic actuator using at least one control parameter associated with said cinematographic effect in said predetermined set.

2. The method according to claim 1, wherein said at least one command applied to the camera is measured using at least one movement sensor associated with said camera.

3. The method according to claim 1, wherein said at least one command belongs to a group of commands comprising:
command for displacement along at least one axis of a coordinate system associated with a scene filmed by said camera;
command for rotation about at least one axis of a coordinate system associated with a scene filmed by said camera;
in addition to zoom command for said camera.

4. The method according to claim 1, wherein numerical values of the at least one command applied to the camera produce numerical values controlling the at least one haptic actuator.

5. The method according to claim 1, further comprising transmitting the video content and the at least one command applied to the camera during said at least one sequence to a device for reproducing video content and controlling the at least one haptic actuator, the obtaining of the at least one control parameter for the at least one haptic actuator being executed by said device.

6. The method according to claim 1, further comprising transmitting the video content and the at least one control parameter for the at least one haptic actuator to a device for reproducing video content and controlling the at least one haptic actuator.

7. The method according to claim 6, wherein a plurality of groups of control parameters for the at least one haptic actuator are associated with said at least one sequence, each group of parameters being associated with a device for reproducing video content and controlling particular haptic actuators.

8. The method according to claim 1, wherein the actuators are three in number, two actuators intended to be gripped, one in each hand, by a spectator, and one actuator intended to support the head of said spectator.

9. The method according to claim 1, wherein if no cinematographic effect is detected during a sequence, then the at least one control parameter for the at least one haptic actuator associated with said at least one sequence is obtained from the control values applied to the camera during filming of said at least one sequence.

10. The method according to claim 1 wherein the determined cinematographic effect belongs to a group of cinematographic effects comprising: arc shot, crane shot, Dutch angle, travelling shot, tilt shot, vertigo shot and zoom.

11. A device configured for reproducing at least one sequence of a video content filmed using a camera, the video content being a first part of an enhanced content, wherein said device comprises at least one processor configured to:
retrieve a cinematographic effect from a predetermined set of cinematographic effects by analyzing commands applied to the camera when filming the at least one sequence; said at least one data being a second part of the enhanced content and comprising at least zoom commands for said camera; a cinematographic effect of said predetermined set being associated with a sequence of camera commands to retrieve when analyzing; and
control, during the reproduction of the at least one sequence, at least one haptic actuator using at least one control parameter associated with said cinematographic effect in said predetermined set.

12. The device according to claim 11, wherein the at least one processor is configured to control three haptic actuators, two actuators being intended to be gripped, one in each hand, by a spectator, and one actuator being intended to support the head of said spectator.

13. The device according to claim 11, wherein said at least one command applied to the camera is measured using at least one movement sensor associated with said camera.

14. The device according to claim 11, wherein said at least one command belongs to a group of commands comprising:
command for displacement along at least one axis of a coordinate system associated with a scene filmed by said camera;
command for rotation about at least one axis of a coordinate system associated with a scene filmed by said camera;
in addition to zoom command for said camera.

15. The device according to claim 11, wherein numerical values of the at least one command applied to the camera produce numerical values controlling the at least one haptic actuator.

16. The device according to claim 11, wherein the at least one processor is further configured to transmit the video content and the at least one command applied to the camera during said at least one sequence to a device for reproducing video content and controlling the at least one haptic actuator.

17. The device according to claim 11, wherein the at least one processor is further configured to transmit the video content and the at least one control parameter for the at least one haptic actuator to a device for reproducing video content and controlling the at least one haptic actuator.

18. The device according to claim 17, wherein a plurality of groups of control parameters for the at least one haptic actuator are associated with said at least one sequence, each group of parameters being associated with a device for reproducing video content and controlling particular haptic actuators.

19. The device according to claim 11, wherein when no cinematographic effect is detected during a sequence, then the at least one control parameter for the at least one haptic actuator associated with said at least one sequence is obtained from control values applied to the camera during filming of said at least one sequence.

20. The device according to claim 11 wherein the determined cinematographic effect belongs to a group of cinematographic effects comprising: arc shot, crane shot, Dutch angle, travelling shot, tilt shot, vertigo shot and zoom.

21. A non-transitory computer-readable storage medium storing a computer program product comprising instructions for implementing the method according to claim 1, when the program is executed by a processor.

* * * * *

UNITED STATES PATENT AND TRADEMARK OFFICE
CERTIFICATE OF CORRECTION

| | |
|---|---|
| PATENT NO. | : 10,536,682 B2 |
| APPLICATION NO. | : 14/770814 |
| DATED | : January 14, 2020 |
| INVENTOR(S) | : Fabien Danieau et al. |

It is certified that error appears in the above-identified patent and that said Letters Patent is hereby corrected as shown below:

In the Claims

Column 11, Line 51, in Claim 1, after "effects" insert --by--.

Signed and Sealed this
Ninth Day of January, 2024

Katherine Kelly Vidal
*Director of the United States Patent and Trademark Office*